3,404,987
FOOD PRESERVATIVE COMPOSITIONS AND METHOD FOR INHIBITING MICROBIAL GROWTH IN FOOD PRODUCTS
John A. Kooistra, Forest Park, and John A. Troller, Cincinnati, Ohio, assignors to The Procter & Gamble Company, Cincinnati, Ohio, a corporation of Ohio
No Drawing. Filed Mar. 31, 1965, Ser. No. 444,407
12 Claims. (Cl. 99—150)

This invention relates to a method for potentiating and enhancing the antimicrobial activity of certain known preserving agents and, more particularly, to novel food additive compositions containing a preserving agent and a potentiating agent for increasing the antimicrobial effectiveness and life-span of the preserving agent.

As used herein, the term "preserving agent" is not used in its narrow sense to describe agents which absolutely prevent the growth of various groups of microorganisms but rather this term is used generically to include agents which retard, inhibit, or prevent the growth of microorganisms. "Microorganisms" and "microbial activity" are used herein to include a number of molds and yeasts. "Food" and "food products," as used herein, include not only materials suitable for human and/or animal consumption that are in solid form but also beverages and other substances that are commonly associated with nutriments or other edible materials.

A food preserving agent inhibits or retards the formation or development of various groups of microorganisms including yeasts and molds. Known preserving agents that are suitable for use in food products are generally effective against some microorganisms at relatively low concentrations. However, substantially higher concentrations of these agents may be required before a satisfactory growth inhibition of other microorganisms occurs.

For the safety of the consumer, food products must be protected against various groups of microorganisms including yeasts and molds to insure the suitability of the food for consumption after a period of storage. Heretofore, protection of food against deterioration by microorganisms has been generally provided by one or more of the common preserving agents. Of these agents, sorbic acid, benzoic acid and its lower alkyl esters, propionic acid, and their edible alkali metal and alkaline earth metal salts have been most widely used in food products. However, it is not always possible to utilize a sufficient amount of these agents to insure adequate and lasting protection. An effective amount may either exceed the approved level for food preserving agents or affect the flavor of the food adversely.

Even in the few areas of use where the above-mentioned common preserving agents are fully effective, as regards protection against microorganisms, this effectiveness is quite limited in time. That is, protection is not adequate because the preserving agent loses its potency before the subject food or other product is used by the ultimate consumer.

It has been deemed particularly desirable to provide a method for potentiating, enhancing, and substantially extending the life-span of the antimicrobial activity of the common food preserving agents. Enhancing the protective power of these agents would increase the effectiveness of the preserving agents in food products wherein the approved maximum level of the preserving agent has been heretofore insufficient to control the growth of certain deleterious microorganisms. It would also permit the effective use in food products of unusually low levels of the common food preserving agents without jeopardizing their protection against microbial attack. In addition, it would make it possible to protect fully those food products in which ineffective levels of preserving agents are now used because of the undesired detectable taste of these agents when used in larger quantities. Further, extending the life-span of the preservative would render a longer shelf-life to any product thus greatly reducing the incidence of spoilage.

Auxiliary compounds used to potentiate and enhance the antimicrobial effectiveness of food preserving agents must be non-toxic to humans and/or animals and should have no adverse effect upon the flavor of the food product at the levels at which they are employed. In addition, they should remain active for the period of time during which the food product is stored prior to use.

Accordingly, it is an object of this invention to provide a novel food additive composition, consisting of a preserving agent and a potentiating agent, which is effective in inhibiting microbial growth in food systems.

It is another object of this invention to provide a novel food additive composition consisting of a food preserving agent and a potentiating agent, which is effective in inhibiting microbial growth for a substantially longer period of time compared to the preserving agent per se.

It is a further object of this invention to provide a method for substantially extending the time period over which certain food preserving agents exhibit antimicrobial activity.

Still a further object of this invention is to provide a novel combination of a food preserving agent and a potentiating agent which has no adverse effect on the palatability of foodstuffs and beverages and which insures that the food product is protected against deterioration attributed to molds, yeasts, and other microorganisms until such time as it is ordinarily consumed.

In accordance with this invention, a novel antimicrobial composition effective in retarding, inhibiting or preventing microbial growth in food products consists essentially of from about 1 to about 10 parts by weight of an edible mineral salt selected from the group consisting of salts of iron, manganese, zinc, tin, and silver and from about 1 to 150 parts by weight of an edible preservative substance selected from the group consisting of propionic acid, sorbic acid, benzoic acid, methyl and ethyl esters of benzoic acid and edible salts of these acids.

Any edible mineral salt of the above-listed metals can be used in this invention. Illustrative of preferred salts which can be used as the potentiating agent of this invention are the phosphates, carbonates, chlorides, nitrates, sulfates, pyrophosphates, and hydroxides of iron, manganese, zinc, tin and silver. Salts which give especially favorable results are manganese chloride, manganese phosphate, ferric chloride and ferrous sulfate. Chlorides, sulfates, and phosphates are preferred anions for use in food compositions because they exhibit very little taste.

The preserving agent used in conjunction with the potentiating agent can be propionic acid, sorbic acid, benzoic acid, methyl and ethyl esters of benzoic acid and edible salts of these acids. Suitable salts include alkali metal and alkaline earth metal salts such as sodium, potassium, magnesium and calcium; methyl and ethyl para-hydroxy benzoate are also suitable. These compounds all possess a recognizable degree of antimicrobial activity. Sorbic acid, potassium sorbate, and calcium propionate are particularly preferred compounds because of their high degree of antimicrobial activity and their comparatively less detectable taste.

The cooperative effect between the preserving agent and the potentiating agent is not clearly understood except that it is apparent that the cation in the potentiating agent is responsible for the enhanced and sustained antimicrobial activity of the preserving agent. Although the use of the named potentiating agents and the named preserving agents, individually, does give some degree of antimicrobial protection, the novel compositions of this invention show outstanding activity against microorganisms. The antimicrobial efficacy of the novel compositions disclosed herein is surprisingly superior and greater than one would be led to expect when observing the effects of the individual components.

Not only do the novel compositions of this invention demonstrate surprisingly superior antimicrobial activity but this activity is sustained for relatively long periods of time. It is well known that the preserving agents described above are normally active ony for a limited time period. The exact reason for this limited activity with respect to time is not known but it is generally thought to involve oxidative deterioration of the preserving agent. The fact that the potentiating agents stabilize the activity of the preserving agents for substantially extended periods of time is totally unexpected since the potentiating agents are not antioxidants. Thus, it is completely unexpected that a potentiating agent such as manganese chloride would stabilize the activity of a preserving agent such as sorbic acid. Reference herein to the above described edible mineral salts as "potentiating agents" fairly characterizes their potentiating, enhancing, sustaining, and stabilizing properties.

The novel combinations of this invention of potentiating agents and preserving agents are especially useful as food additives and can be used in the following food products in which food preserving agents have been shown to have utility: meats; fish; cheese (particularly cottage cheese); milk; ice cream; fruit juices such as apple juice, orange juice and tomato juice; corn syrup, maple syrup; chocolate syrup and candy; fruits including dried, fresh, and citrus fruits; vegetables; beer, wine; farinaceous-containing products such as bread (when the preserving agent is introduced in a manner which does not interfere with the proofing of the dough) and cakes; butter; oleomargarine and butter substitutes; vegetable and animal oils and fats; candies; icings and toppings.

Any suitable and convenient technique can be employed to protect food products from microbial deterioraion which insures an intimate association of the novel food additive compositions of this invention with the food product to be protected. Thus, the preserving agent and the potentiating agent can be incorporated in the food product. When the food product is prepared in a completely sterile manner, the product can be protected by coating the surface of the prepared product. This coating can be applied by dipping the food product in a solution containing the preserving and potentiating agents. Alternatively, a solution of these agents can be washed, sprayed, or otherwise applied to the surface of the food product. A solid dusting compound can be composed by using a dry mixture of the preserving agent and the potentiating agent either alone or in admixture with another ingredient such as flour or milk solids. These mixtures can be either dusted on the surface of a sterile food product or, if mixed with an ingredient of the food product, incorporated in the product itself. The preserving agent and the potentiating agent can also be dispersed in other materials, particularly vegetable oils and fats, intended for use in food products. In addition, the novel food additive compositions can be effectively incorporated in or coated onto the surface of wrapping materials used to intimately surround food products which are to be protected.

Although any of the above-enumerated methods of protecting these food products can be employed, the following illustrative methods are most convenient: the preserving agent and the potentiating agent are dissolved in fruit juice, beer, wine or other substantilly liquid products. In the instance of milk, it may be more desirable to utilize the protection on the wall of the paper milk carton by coating the carton with a solution of the preservative and potentiating agent. A product such as bread can be protected by including the food additive compositions of this invention in the dough in such a manner that they do not interfere with the biological activity of the yeast or by applying the protective agents to the bread wrapper. Articles such as fruits and vegetables can be washed in, dipped in, or sprayed with a solution containing the preservative agent and potentiating agent, or these articles may be incorporated onto the material utilized for wrapping such products.

It is generally desirable to insure the required protection of food products to use from about 0.02% to about 1.0% by weight of the food product of the compositions of this invention containing a preservative agent and the potentiating agent. This is a generally preferred amount of the composition since it provides extremely effective antimicrobial activity for a long period of time without adding any detectable taste to the food product. In many foods products, however, adequate protection can be achieved by using from about 0.02% to about 0.5% by weight of the food product of the compositions of this invention.

EXAMPLE I

The effectiveness of this invention's novel combinations of preserving agent and potentiating agent in controlling the growth and development of microorganisms responsible for the deterioration of food products is exemplified by the results obtained in the following in vitro tests with a strain of *Aspergillus niger,* one of the most common food spoilage molds. Substantially similar results are observed with other molds such as *Penicillium citrinum, Aspergillus sydowi,* and *Aspergillus repens;* and, a yeast, *Saccharomyces cereviseae.*

In conducting the test with *Aspergillus niger,* 1 liter of an agar medium was first prepared having the following composition:

| Substance: | Grams/liter of water |
|---|---|
| Asparagine monohydrate | 5.0 |
| Glucose | 10.0 |
| $MgSO_4 \cdot 7H_2O$ | 0.25 |
| $KH_2PO_4$ | 0.25 |
| $FeSO_4 \cdot 7H_2O$ | 0.001 |
| Agar | 20.0 |

Each preserving agent, potentiating agent, and each combination thereof, as shown in Table I, was added to each of three 20 cc. samples of the agar medium.

The pH of the samples was adjusted to 5.0 by adding a small amount of 0.1 N NaOH. The samples were then sterilized with steam at 121° C. for 15 minutes. Each 20 cc. sample was then poured into a Petri dish and allowed to cool to room temperature before being stab inoculated with a bacteriological inoculating needle previously dipped in a saline suspension of *Aspergillus niger* spores. The length of time required for the commencement of mold growth was visually determined and a measurement of the rate of enlargement of the mold colony was recorded. An averaged value of these mold growth data for the three samples of each preserving agent, potentiating agent, and each combination thereof, is shown in Table I.

TABLE I.—*ASPERGILLUS NIGER* COLONY DIAMETER IN AGAR MEDIUM (MILLIMETERS)

| Days of Storage of Agar Medium at 30° C. | A 0.02%* Potassium Sorbate | B 0.076%* $SnCl_2$ | A+B | C 0.15%* Potassium Sorbate | C+B | D 0.055%* $ZnCl_2$ | C+D | E 0.20%* Calcium Propionate | F 0.055%* $ZnCl_2$ | E+F | G 0.10%* Sodium Benzoate | H .05%* $ZnCl_2$ | G+H |
|---|---|---|---|---|---|---|---|---|---|---|---|---|---|
| 2 | 10 | 10 | 0 | 5 | 0 | 5 | 0 | 15 | 30 | 5 | 5 | 5 | 0 |
| 4 | 25 | 35 | 0 | 15 | 0 | 15 | 0 | 22 | 38 | 5 | 15 | 8 | 5 |
| 6 | 40 | 55 | 0 | 28 | 0 | 25 | 1 | 35 | 55 | 10 | 25 | 18 | 8 |
| 8 | 55 | 80 | 0 | 37 | 0 | 38 | 5 | 50 | 75 | 17 | 35 | 40 | 10 |
| 10 | 70 | 100 | 5 | 48 | 0 | 50 | 8 | 60 | 90 | 15 | 45 | 50 | 18 |

*Percent by weight of the agar medium.

TABLE II.—ASPERGILLUS NIGER COLONY DIAMETER IN AGAR MEDIUM AFTER SEVEN DAYS' INCUBATION AT 25° C. (MILLIMETERS)

| Weeks of Storage of Solution at 37° C. Before Incubation | A 0.1%* Sorbic Acid | B 0.001%* MnSO₄ | A+B | C 0.001%* AgNO₃ | A+C | D 0.001%* FeCl₃ | A+D | E 0.001%* FeSO₄ | A+E |
|---|---|---|---|---|---|---|---|---|---|
| 1 | 2 | 36 | 0 | 34 | 1 | 33 | 2 | 28 | 2 |
| 2 | 3 | 33 | 1 | 36 | 2 | 29 | 2 | 31 | 2 |
| 3 | 5 | 33 | 2 | 32 | 4 | 24 | 1 | 32 | 2 |
| 4 | 11 | 32 | 4 | 30 | 5 | 37 | 2 | 33 | 2 |
| 5 | 14 | 31 | 4 | 35 | 7 | 33 | 1 | 37 | 2 |
| 6 | 18 | 32 | 6 | 32 | 7 | 32 | 2 | 29 | 1 |
| 7 | 20 | 32 | 5 | 34 | 10 | 32 | 2 | 31 | 2 |

*Percent by weight of the agar medium.

Table I vividly illustrates how the potentiating agent not only substantially extends the life-span of the preserving agent but also greatly enhances the antimicrobial efficacy of the preserving agent. The enhancing effect is demonstrated, for instance, by referring to Table I, Columns A and B. After 10 days' storage at 30° C. the *Aspergillus niger* colony diameter had increased to 70 and 100 mm. in the presence of 0.02% potassium sorbate and 0.076% SnCl₂ respectively. However, when these same amounts of potassium sorbate and SnCl₂ were combined, as shown in Column A+B of Table I, the colony diameter had increased to only 5 mm. after 10 days' storage at 30° C.

These results also can be readily translated to food products. For instance, the combination of calcium propionate and zinc chloride, as shown in Column E+F of Table I, is shown hereinafter in Example IV to be effective against mold growth in an ordinary loaf of white bread.

EXAMPLE II

This example is illustrative of the manner in which the compositions of this invention exhibit a substantially extended life-span compared to the life span of the preserving agents alone.

In conducting the following in vitro tests, a two liter quantity of a 0.1% by weight sorbic acid in water solution was prepared in a glass flask. Two liter quantities of 0.001% by weight solutions in water of the potentiating agents shown in Columns B, C, D and E of Table II were also prepared in glass flasks. Additionally, two liter quantities of water solutions each comprising 0.1% by weight of sorbic acid and 0.001% by weight of the potentiating agent, as shown in Columns A+B, A+C, A+D and A+E of Table II, were prepared in glass flasks.

At the weekly intervals shown in Table II, 100 cc. aliquots were removed from each flask. These aliquots were used to prepare agar media having the following composition:

Substance: Grams/liter of water
- Asparagine monohydrate _____ 5.0
- Glucose _____ 10.0
- MgSO₄·7H₂O _____ 0.25
- KH₂PO₄ _____ 0.25
- FeSO₄·7H₂O _____ 0.001
- Agar _____ 20.0

Each agar medium thus prepared was then adjusted to a pH of 5.0 by adding a small amount of 0.1 N HCl. Three 15 cc. samples were taken from each agar medium. These samples were then sterilized with steam at 121° C. for 15 minutes. Each 15 cc. sample was then poured into a Petri dish and allowed to cool before being stab inoculated with a bacteriological inoculating needle previously dipped in a saline suspension of *Aspergillus niger* spores.

The Petri dishes were then incubated for seven days at 25° C. at which time the diameter of the *Aspergillus niger* colony was measured. An averaged value of these mold growth data for the three samples of each test is shown in Table II.

Table II illustrates how the potentiating agent extends the life-span of the preserving agent. For instance, Column A shows that a 0.1% sorbic acid solution which had been stored for seven weeks allowed the *Aspergillus niger* colony to grow to a diameter of 20 mm. When 0.001% of FeSO₄ was added to a 0.1% solution of sorbic acid and the solution stored for seven weeks, the *Aspergillus niger* colony diameter remained at only 2 mm. as shown in Column A+E of Table II.

Substantially similar results are observed when a potentiating agent such as manganese chloride or manganese phosphate is combined with sorbic acid or a preserving agent such as calcium propionate, sodium benzoate, propionic acid, benzoic acid, and methyl or ethyl para-hydroxy benzoate, when these combinations are used in an amount of from about 0.02% to about 1.0% by weight of the agar medium and comprise 1 to 10 parts by weight potentiating agent and 1 to 150 parts by weight preserving agent.

These in vitro tests show that this invention's novel combinations of preservative and potentiating agent are effective in preventing mold growth. These results may be readily translated to food products as is hereinafter illustrated in Examples III to V. For instance, the combination of sorbic acid and ferrous sulfate, as shown in Column A+E of Table II, is shown hereinafter in Example V to be effective against mold growth in an icing composition.

EXAMPLE III

A conventional non-leavened test dough composition was prepared using water, flour, and a plastic shortening having an iodine value of about 80. The composition contained 0.2% by weight of NaCl. The shortening to flour ratio was maintained at 0.65:1 by weight and the pH was adjusted to 5.4 with HCl. A water level of 18% by weight of the dough composition was used; this level of water is optimal for most mold growth. Each preserving agent, potentiating agent, and each combination thereof, as shown below in Tests A–F of Table III, was added to a 500 gram batch of the dough composition by admixing these agents with the water. No precautions were taken to remove or avoid microbial contamination during the normal preparation steps.

Thirty-two 10–15 gram dough samples for each of tests shown in Table III were taken from each 500 gram batch of conventional dough, as prepared above, and the samples were extruded into 6 dram, snap-cap vials which were then capped and sealed with paraffin. These vials were then stored at 80° F. for 250 days. At the time intervals indicated below in Table III, the vials of samples were observed and the number of samples showing macroscopically visible molding were noted. These data are recorded in Table III.

TABLE III.—NUMBER OF SAMPLES OF DOUGH SHOWING MOLDING

| Test | Percent by Weight of Dough Composition | | | | | |
|---|---|---|---|---|---|---|
| | A | B | C | D | E | F |
| Calcium Propionate | 0.00 | 0.00 | 0.00 | 0.20 | 0.20 | 0.20 |
| MnCl₂ | 0.00 | 0.05 | 0.10 | 0.00 | 0.05 | 0.10 |
| Days Storage: | | | | | | |
| 14 | 32 | 32 | 32 | 0 | 0 | 0 |
| 28 | 32 | 32 | 32 | 4 | 0 | 0 |
| 42 | 32 | 32 | 32 | 15 | 2 | 0 |
| 112 | 32 | 32 | 32 | 23 | 2 | 0 |
| 154 | 32 | 32 | 32 | 25 | 2 | 0 |
| 250 | 32 | 32 | 32 | 25 | 2 | 0 |

It is noted from Table III that the novel combinations of this invention as shown in Columns E and F effectively preserved the dough composition.

Substantially similar results are observed with manganese phosphate, ferric chloride, or ferrous sulfate, as the potentiating agent combined with a preserving agent such as sorbic acid or sodium benzoate, when used in the proportions and amounts shown in Columns E and F of Table III.

EXAMPLE IV

This example is illustrative of how the preservative compositions of this invention can substantially extend the shelf life of a typical loaf of ordinary white bread.

A quantity of brew was prepared by mixing the following ingredients in a stainless steel tank:

| | Percent by weight |
|---|---|
| Water | 67.16 |
| Liquid sugar (18% by weight of water) | 10.00 |
| NaCl | 2.20 |
| Non-fat dry milk solids | 1.50 |
| Yeast foods | 0.75 |
| Compressed yeast | 3.25 |
| Bread flour (malted) | 15.00 |
| Monocalcium phosphate | 0.14 |

The brew was mildly agitated and allowed to ferment for 2.5 hours at 90° F. Thereafter, the brew was cooled to 70° F. and mixed for six minutes with the following ingredients in a stainless steel tank to yield a dough:

| | Percent by weight |
|---|---|
| Brew | 51.10 |
| Bread flour | 42.70 |
| Oxidant solution | 1.00 |
| (80 p.p.m. kBrO₃). | |
| (15 p.p.m. kIO₃). | |
| Shortening | 1.62 |
| Water | 3.54 |
| Calcium propionate | (X) |
| ZnCl₂ | (Y) |

The ZnCl₂ was dissolved in the water of the dough before addition to the other ingredients; with this exception, all the other ingredients were merely physically admixed.

After the dough had been proofed at 105° F. for one hour it was baked at 410° F. for 30 minutes into bread.

Zinc chloride, calcium propionate, and combinations thereof as shown in Table IV were incorporated into the bread, as described above. Unwrapped slices of the bread were then placed on sterile Petri dishes and stored at 80° F. and 95% relative humidity and the time required for the first macroscopically visible molding to occur was recorded in Table IV.

TABLE IV.—DAYS REQUIRED FOR MACROSCOPICALLY VISIBLE MOLDING OF BREAD

| Percent by Weight of Bread | | Days Required for Molding |
|---|---|---|
| Zinc Chloride | Calcium Propionate | |
| 0 | 0.04 | 4 |
| 0.10 | 0 | 3 |
| 0.10 | 0.04 | 8 |
| 0.07 | 0.04 | 11 |
| 0.035 | 0.04 | 5 |

Table IV shows that a combination of zinc chloride and calcium propionate substantially extends the time period before ordinary white bread shows molding. More specifically, a concentration in the bread of 0.10% zinc chloride combined with 0.04% calcium propionate at least doubles the days of protection against molding, as compared to the protection obtained with the same respective concentrations of either ingredient used individually.

EXAMPLE V

The unusual antimicrobial effectiveness of the preservative compositions of this invention have been demonstrated in non-refrigerated icings which are particularly susceptible to attack by microorganisms. This test can be substantially duplicated with other products which are equally susceptible to deterioration such as, for example, cakes or cheese. In this particular example, a chocolate icing product having a pH of 6.75 and having the following composition was used.

| Ingredients: | Percent by weight |
|---|---|
| Water | 18.6 |
| Carragheen gum | 0.09 |
| Powdered sugar (sucrose) | 52.15 |
| Non-fat milk solids | 2.3 |
| Dextrose | 4.5 |
| NaCl | 0.3 |
| Shortening | 15.0 |
| Flavor | 0.06 |
| Cocoa | 7.0 |

To batches of the above product, 0.10% by weight of the icing of sorbic acid was added and uniformly mixed therein. The same weight percentage of sorbic acid plus other percentages by weight of icing of FeSO₄ were uniformly mixed into other batches as shown in Table V. Samples of the batches were placed in individual 6-dram snap-on vials and the sealed vials placed in plastic bags. These plastic bags were kept at room temperature (25° C.) for a total of 97 days. At the end of this period, the individual vials were inspected and the number of samples showing macroscopically visible mold growth were recorded in Table V.

TABLE V.—MOLD GROWTH IN AN ICING COMPOSITION

| Percent Weight of the Icing | | Total Number of Samples | Number of Samples Showing Visible Mold Growth |
|---|---|---|---|
| Sorbic Acid | FeSO₄ | | |
| 0.00 | 0.00 | 6 | 6 |
| 0.00 | 0.005 | 6 | 6 |
| 0.1 | 0.00 | 6 | 5 |
| 0.1 | 0.001 | 6 | 4 |
| 0.1 | 0.005 | 6 | 3 |
| 0.1 | 0.020 | 6 | 0 |

Table V shows that a combination of sorbic acid and ferrous sulphate effectively inhibits mold growth in an icing composition. For instance, in the presence of either 0.1% sorbic acid or 0.005% ferrous sulphate individually, all six samples of icing showed visible mold growth after 97 days' storage. However, when the same amounts of these ingredients were combined in the icing, only three samples thereof show visible mold growth after 97 days' storage.

It will be apparent to those skilled in the art that variations and modifications of the present invention can be made upon study of the foregoing disclosure. Such variations and modifications are intended to be within the spirit and scope of this invention as defined in the appended claims.

What is claimed is:
1. An antimicrobial food preservative composition consisting essentially of from about 1 to 10 parts by weight an edible mineral salt selected from the group consisting of salts of iron, manganese, zinc, tin, and silver and from about 1 to 150 parts by weight of an edible preservative substance selected from the group consisting of propionic acid, sorbic acid, benzoic acid, methyl and ethyl esters of benzoic acid and edible salts of these acids.

2. The composition of claim 1 wherein the edible mineral salt is manganese chloride and the edible preservative is sorbic acid.

3. The composition of claim 1 wherein the edible mineral salt is manganese phosphate and the edible preservative is calcium propionate.

4. The composition of claim 1 wherein the edible mineral salt is ferric chloride and the edible preservative is sorbic acid.

5. A food composition preserved against spoilage containing from about 0.02% to about 1.0% by weight of an antimicrobial composition consisting essentially of from about 1 to about 10 parts by weight of an edible mineral salt selected from the group consisting of salts of iron, manganese, zinc, tin, and silver and from about 1 to 150 parts by weight of an edible preservative substance selected from the group consisting of propionic acid, sorbic acid, benzoic acid, methyl and ethyl esters of benzoic acid and edible salts of these acids.

6. The food composition of claim 5 wherein the antimicrobial composition is present in an amount from about 0.02% to about 0.5% by weight of said food composition.

7. The food composition of claim 6 wherein the edible mineral salt is manganese chloride and the edible preservative is sorbic acid.

8. The food composition of claim 6 wherein the edible mineral salt is manganese phosphate and the edible preservative is calcium propionate.

9. The food composition of claim 6 wherein the edible mineral salt is ferric chloride and the edible preservative is sorbic acid.

10. A process for inhibiting microbial growth in a food product which comprises incorporating therein from about 0.02% to about 1.0% by weight of an antimicrobial composition consisting essentially of from about 1 to about 10 parts by weight of an edible mineral salt selected from the group consisting of salts of iron, manganese, zinc, tin, and silver and from about 1 to 150 parts by weight of an edible preservative substance selected from the group consisting of propionic acid, sorbic acid, benzoic acid, methyl and ethyl esters of benzoic acid and edible salts of these acids.

11. A bread product preserved against spoilage containing water, flour, and yeast and containing from about 0.02% to about 1.0% by weight of an antimicrobial composition consisting essentially of from about 1 to about 10 parts by weight of an edible mineral salt selected from the group consisting of salts of iron, manganese, zinc, tin, and silver and from about 1 to 150 parts by weight of an edible preservative substance selected from the group consisting of propionic acid, sorbic acid, benzoic acid, methyl and ethyl esters of benzoic acid and edible salts of these acids.

12. An icing composition preserved against spoilage comprising sugar, water, and shortening, and containing from about 0.02% to about 1.0% by weight of an antimicrobial composition consisting essentially of from about 1 to about 10 parts by weight of an edible mineral salt selected from the group consisting of salts of iron, manganese, zinc, tin, and silver, and from about 1 to 150 parts by weight of an edible preservative substance selected from the group consisting of propionic acid, sorbic acid, benzoic acid, methyl and ethyl esters of benzoic acid and edible salts of these acids.

References Cited

UNITED STATES PATENTS

| | | | |
|---|---|---|---|
| 2,997,394 | 8/1961 | Melnick et al. | 99—90 |
| 3,038,810 | 6/1962 | Akerboom et al. | 99—150 |
| 3,276,881 | 10/1966 | Troller | 99—139 |

RAYMOND N. JONES, *Primary Examiner.*